(12) United States Patent
Pandurangarao et al.

(10) Patent No.: US 12,417,165 B2
(45) Date of Patent: *Sep. 16, 2025

(54) SYSTEMS AND METHODS FOR AUTOMATED CODE VALIDATION

(71) Applicant: ALLSTATE INSURANCE COMPANY, Northbrook, IL (US)

(72) Inventors: Anil Kumar Pandurangarao, Buffalo Grove, IL (US); Sudharshun Ravichander, Des Plaines, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/468,996

(22) Filed: Sep. 8, 2021

(65) Prior Publication Data

US 2021/0406448 A1    Dec. 30, 2021

Related U.S. Application Data

(63) Continuation of application No. 16/743,394, filed on Jan. 15, 2020, now Pat. No. 11,138,366.

(Continued)

(51) Int. Cl.
*G06F 11/3668*   (2025.01)
*G06F 40/151*    (2020.01)
*G06V 30/413*    (2022.01)

(52) U.S. Cl.
CPC ...... *G06F 11/3676* (2013.01); *G06F 11/3684* (2013.01); *G06F 11/3688* (2013.01);
(Continued)

(58) Field of Classification Search
CPC ............... G06F 40/151; G06F 11/3684; G06F 11/3688; G06F 11/3692; G06F 11/3676; G06V 30/413
(Continued)

(56) References Cited

U.S. PATENT DOCUMENTS 6,071,316 A    6/2000 Goossen et al.
6,625,760 B1   9/2003 Man et al.
(Continued)

OTHER PUBLICATIONS

Nathan Patnam, Coverage and How to Use Them in Python, Published Feb. 17, 2018 by Medium, pp. 1-17 (pdf).*
(Continued)

*Primary Examiner* — Manglesh M Patel
(74) *Attorney, Agent, or Firm* — Dinsmore & Shohl LLP

(57) ABSTRACT

Systems and methods in accordance with embodiments of the invention can automatically track the creation of documents, such as source code files and unit tests, along with the development of those documents. The document creation and development workflow can be automatically validated against a defined set of standards to ensure that the documents are properly created. The review of the documents can also be automatically validated to ensure that the review process is properly completed. A variety of metrics can be generated regarding errors and issues identified during the validation processes. These metrics can be used to identify common issues, automatically generate proactive suggestions to avoid issues during document creation and testing, and/or generate developer profiles indicating the performance of particular developers.

20 Claims, 9 Drawing Sheets

Related U.S. Application Data

(60) Provisional application No. 62/810,071, filed on Feb. 25, 2019.

(52) U.S. Cl.
CPC ........ *G06F 11/3692* (2013.01); *G06F 40/151* (2020.01); *G06V 30/413* (2022.01)

(58) Field of Classification Search
USPC ........................................ 715/234, 200, 237
See application file for complete search history.

(56) References Cited

U.S. PATENT DOCUMENTS

| | | | |
|---|---|---|---|
| 6,959,432 | B2 | 10/2005 | Crocker |
| 6,986,125 | B2 | 1/2006 | Apuzzo et al. |
| 7,490,319 | B2 | 2/2009 | Blackwell et al. |
| 7,596,778 | B2 | 9/2009 | Kolawa et al. |
| 8,347,267 | B2 | 1/2013 | Givoni |
| 8,490,194 | B2 | 7/2013 | Moskovitch et al. |
| 8,799,868 | B2 | 8/2014 | Ndem et al. |
| 8,806,619 | B2 | 8/2014 | Lomont et al. |
| 8,997,061 | B1* | 3/2015 | Davison ............. G06F 11/3688 717/124 |
| 9,009,834 | B1 | 4/2015 | Ren et al. |
| 9,201,646 | B2 | 12/2015 | Balachandran |
| 9,235,494 | B2 | 1/2016 | Gautam |
| 9,275,291 | B2 | 3/2016 | Shulman et al. |
| 9,378,112 | B2 | 6/2016 | Banerjee et al. |
| 9,396,094 | B2 | 7/2016 | Browne et al. |
| 9,405,661 | B1* | 8/2016 | Chirgwin ............ G06F 11/3692 |
| 9,720,687 | B2 | 8/2017 | Muthusamy |
| 10,140,886 | B2 | 11/2018 | Du et al. |
| 10,310,968 | B2 | 6/2019 | Biddle et al. |
| 10,474,455 | B2 | 11/2019 | Makkar |
| 10,657,023 | B1* | 5/2020 | Willson ............ G06F 11/3676 |
| 10,678,678 | B1* | 6/2020 | Tsoukalas ........... G06F 11/3664 |
| 10,915,437 | B1* | 2/2021 | Arguelles ........... G06F 11/3688 |
| 11,334,351 | B1* | 5/2022 | Pandurangarao .... G06Q 10/067 |
| 11,392,844 | B1* | 7/2022 | Rao ..................... G06F 11/3698 |
| 11,494,285 | B1* | 11/2022 | Manthey ............. G06F 11/3604 |
| 11,544,048 | B1* | 1/2023 | Ravindran .......... G06F 11/3692 |
| 2007/0234308 | A1 | 10/2007 | Feigenbaum |
| 2008/0120602 | A1* | 5/2008 | Comstock ........... G06F 11/3688 717/124 |
| 2008/0263505 | A1 | 10/2008 | StClair et al. |
| 2009/0055804 | A1 | 2/2009 | Blaschek et al. |
| 2009/0070734 | A1* | 3/2009 | Dixon ................ G06F 11/3616 717/122 |
| 2009/0138855 | A1* | 5/2009 | Huene .................. G06F 8/75 717/125 |
| 2009/0144698 | A1* | 6/2009 | Fanning ............. G06F 11/3676 717/120 |
| 2009/0158256 | A1* | 6/2009 | Ponsford ................. G06F 8/20 717/124 |
| 2009/0172649 | A1* | 7/2009 | Teplitsky ............ G06F 11/3684 717/143 |
| 2009/0265694 | A1* | 10/2009 | Bakowski ........... G06F 11/3676 717/131 |
| 2010/0192128 | A1* | 7/2010 | Schloegel ........... G06F 11/3684 717/125 |
| 2011/0016452 | A1 | 1/2011 | Gorthi et al. |
| 2011/0283260 | A1 | 11/2011 | Bucuvalas |
| 2012/0042210 | A1* | 2/2012 | Glaser ................ G06F 11/3684 714/38.1 |
| 2012/0260230 | A1 | 10/2012 | Choudhary et al. |
| 2013/0024847 | A1* | 1/2013 | Browne ............. G06F 11/3604 717/131 |
| 2013/0254746 | A1* | 9/2013 | Balakrishnan ...... G06F 11/3676 717/124 |
| 2013/0311968 | A1 | 11/2013 | Sharma |
| 2014/0157239 | A1 | 6/2014 | Goetsch |
| 2014/0201703 | A1* | 7/2014 | Boden ................... G06F 8/20 717/101 |
| 2014/0282353 | A1* | 9/2014 | Jubran ..................... G06F 8/71 717/101 |
| 2014/0282411 | A1* | 9/2014 | Liemandt ............ G06F 11/3672 717/124 |
| 2015/0127983 | A1 | 5/2015 | Trobough et al. |
| 2015/0169431 | A1* | 6/2015 | Ivankovic ........... G06F 11/3676 717/124 |
| 2015/0186253 | A1* | 7/2015 | Abraham ............ G06F 11/3409 717/124 |
| 2015/0363295 | A1* | 12/2015 | Gopalakrishnan ......................... G06F 11/3676 717/124 |
| 2016/0063162 | A1* | 3/2016 | Lu .......................... G06F 30/30 716/106 |
| 2016/0179659 | A1* | 6/2016 | Champlin-Scharff ...................... G06F 40/211 717/126 |
| 2016/0321586 | A1* | 11/2016 | Herzig ................ G06F 11/3692 |
| 2017/0060733 | A1* | 3/2017 | Abadi ................ G06F 11/3684 |
| 2017/0075794 | A1* | 3/2017 | Ramakrishna ...... G06F 11/3676 |
| 2017/0083430 | A1* | 3/2017 | Meerovich ................ G06F 8/00 |
| 2017/0132121 | A1* | 5/2017 | Cooper .............. G06F 11/3692 |
| 2017/0329687 | A1 | 11/2017 | Chorley et al. |
| 2018/0101468 | A1* | 4/2018 | Tzabari .............. G06F 11/3688 |
| 2018/0189679 | A1 | 7/2018 | Kang et al. |
| 2018/0275989 | A1 | 9/2018 | Kakkad et al. |
| 2018/0276103 | A1* | 9/2018 | Woulfe .................. G06F 11/36 |
| 2018/0276372 | A1 | 9/2018 | Crabtree et al. |
| 2018/0285247 | A1* | 10/2018 | Gandhi .............. G06F 11/3668 |
| 2019/0102282 | A1* | 4/2019 | DeMarco ............ G06F 11/3688 |
| 2019/0294525 | A1 | 9/2019 | Scheiner et al. |
| 2019/0294536 | A1* | 9/2019 | Avisror ............... G06F 11/3684 |
| 2020/0081814 | A1* | 3/2020 | Srinivasan ................ G06F 8/71 |
| 2020/0125485 | A1* | 4/2020 | Wiener ............... G06F 11/3688 |
| 2020/0167263 | A1 | 5/2020 | Liu et al. |
| 2021/0056211 | A1* | 2/2021 | Olson ...................... G06N 3/08 |
| 2021/0149788 | A1* | 5/2021 | Downie ............. G06F 11/3604 |
| 2021/0191845 | A1* | 6/2021 | Bach .................. G06F 11/3688 |
| 2021/0318946 | A1* | 10/2021 | Wouda ............... G06F 11/3676 |
| 2021/0405976 | A1* | 12/2021 | Gaitonde .................. G06F 8/33 |
| 2022/0164171 | A1* | 5/2022 | Johnson .................... G06F 8/77 |
| 2023/0060909 | A1* | 3/2023 | Plante .................... G06F 18/214 |
| 2023/0281005 | A1* | 9/2023 | Groenewegen ........... G06F 8/71 717/120 |
| 2023/0367590 | A1* | 11/2023 | Shivanna .................. G06F 8/76 |
| 2024/0152368 | A1* | 5/2024 | Groenewegen ....... G06F 40/166 |

OTHER PUBLICATIONS

Nikolaos Georgiou, Linting with Checkstyle, published Mar. 12, 2017, ngeor.com, pp. 1-5 (pdf).*
U.V. Tsiazhkorob et al., Classification of Static Analyzer Warnings using Machine Learning Methods, 2024, IEEE Xplore, pp. 69-74.*
Ugur Koc et al., Learning a Classifier for False Positive Error Reports Emitted by Static Code Analysis Tools, Jun. 18, 2017, ACM, pp. 35-42.*
Gaurav Pahwa, Code review analysis of software system using machine learning techniques, Jan. 2017, ResearchGate, pp. 1-8 (pdf).*
Anshul Gupta et al., Intelligent code reviews using deep learning, 2018, ACM, pp. 1-9 (pdf).*
U.S. Appl. No. 16/743,394, filed Jan. 15, 2020, Anil Kumar Pandurangarao.
Source{d} Technologies Inc., The Data Platform for your Software Development Life Cycle, Giving IT executives visibility into their software portfolio, engineering processes and workforce at scale, 2019.
Mahdi Noorian et al, Machine Learning-based Software Testing: Towards a Classification Framework, University of Brunswick, Fredericton, Canada, Athabasca University, Edmonton, Canada, published in SEKE 2011.
Vera Barstad et al, Predicting Source Code Quality with Static Analysis and Machine Learning, University of Agder, Grimstad, Norway, presented at NIK—2014 conference.
Anshul Gupta et al, Intelligent code reviews using deep learning, Microsoft Corp., KDD'18 Deep Learning Day, Aug. 2018, London, UK.

(56) References Cited

OTHER PUBLICATIONS

Testim, Tests that deliver, automated functional testing, https://www.testim.io/, retrieved Dec. 16, 2019.

Rebecca L. Russell et al, Automated Vulnerability Detection in Source Code Using Deep Representation Learning, 17th IEEE International Conference on Machine Learning and Applications (IEEE ICMLA 2018), Orlando, Florida, USA.

Deepcode AG, Write better code with the knowledge of the global development community, https://www.deepcode.ai, retrieved Dec. 16, 2019.

May 13, 2020—International Search Report & Written Opinion—PCT/US20/17667 (006591.02377).

* cited by examiner

SYSTEMS AND METHODS FOR AUTOMATED CODE VALIDATION

CROSS-REFERENCE TO RELATED APPLICATIONS

The application is a continuation of U.S. Non-Provisional patent application Ser. No. 16/743,394, titled "Systems and Methods for Automated Code Validation" filed Jan. 15, 2020, which claims priority to U.S. Provisional Patent Application No. 62/810,071, titled "Systems and Methods for Automated Code Validation" filed Feb. 25, 2019, the disclosures of which are hereby incorporated by reference in their entirety.

TECHNICAL FIELD

Aspects of the invention relate to code validation and more specifically to the automated validation of software code using machine learning.

BACKGROUND

A variety of documents, such as the source code for computer programs, can be created by developers. Developers typically follow a set of procedures and standards set out by an organization to ensure that the documents are created and tested in a consistent, repeatable manner. The documents are typically manually reviewed by senior developers or managers in order to ensure the quality of the documents and to verify that the appropriate procedures have been followed. The review itself is often defined by review checklists, but many times the checklists are not followed by the developers or reviewers.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Systems and methods in accordance with embodiments of the invention can automatically track the creation of documents, such as source code files and unit tests, along with the development of those documents. The document creation and development workflow can be automatically validated against a defined set of standards to ensure that the documents are properly created. The review of the documents can also be automatically validated to ensure that the review process is properly completed. A variety of metrics can be generated regarding errors and issues identified during the validation processes. These metrics can be used to identify common issues, automatically generate proactive suggestions to avoid issues during document creation and testing, and/or generate developer profiles indicating the performance of particular developers.

The arrangements described can also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

Figure 1:
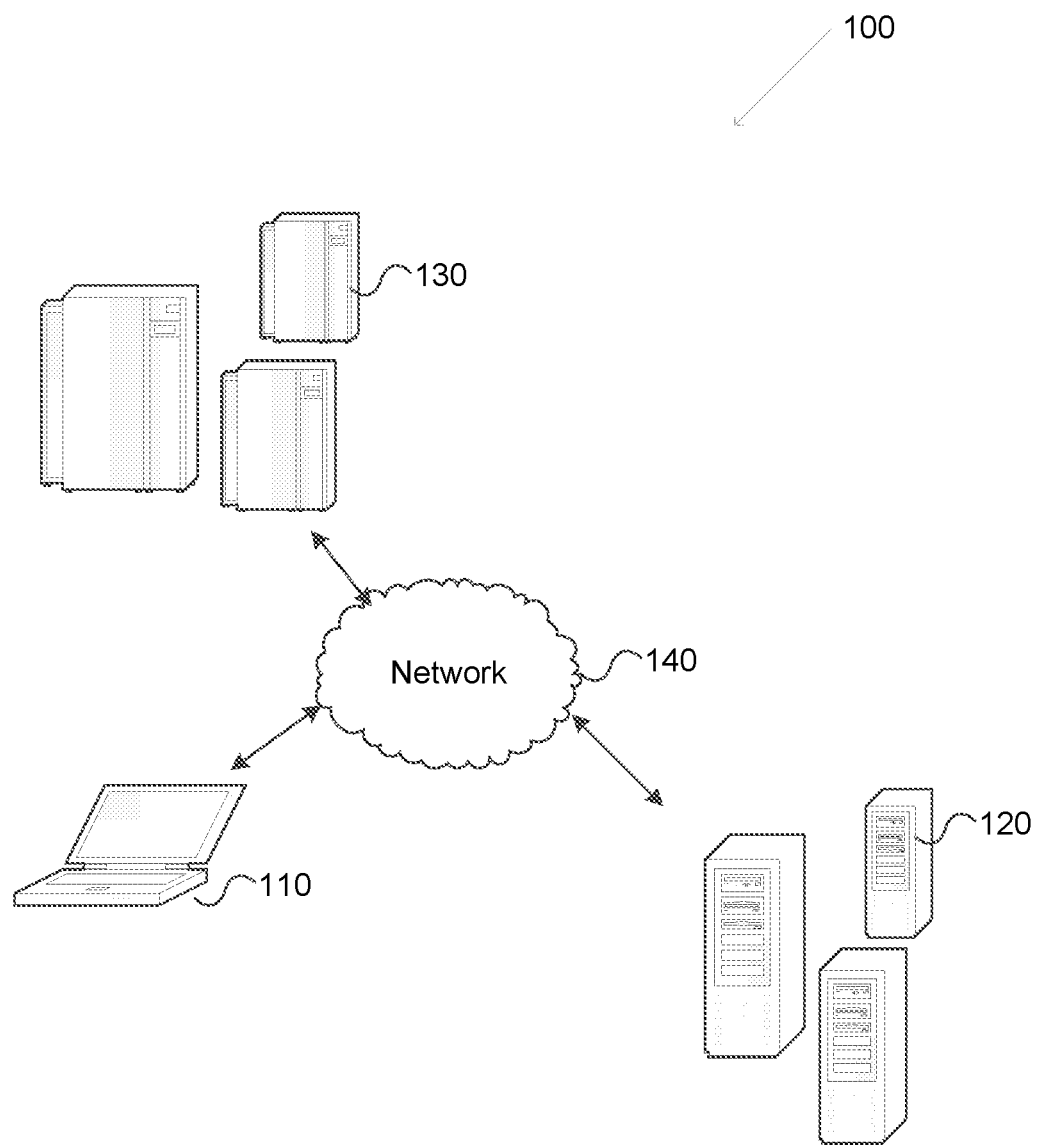
FIG. 1 illustrates an example operating environment in which one or more aspects described herein can be implemented.

In the following description of the various embodiments, reference is made to the accompanying drawings, which form a part hereof, and in which is shown by way of illustration, various embodiments of the disclosure that can be practiced. It is to be understood that other embodiments can be utilized.

Aspects of the disclosure relate to computer hardware and software. In particular, aspects described herein relate to document development devices that allow for recording, monitoring, and/or governing document quality governance standards. Developing documents, such as software source code, is typically an expensive and time-consuming process. Errors made during document development can result in poorly performing software, cost overruns, and delays. The typical document development lifecycle includes a mix of manual processes, such as code review and walkthroughs, and post document creation tools, such as testing suites and tools that analyze documents to flag errors, bugs, and stylistic issues. These processes and tools are typically performed after a document is merged into a common database, such as a version control system. A variety of problems exist with this approach as it is commonly not integrated into the developer's development process and addresses only stylistic and test coverage aspects of the documents and does not address control over the comprehensive document development occurring on document development devices.

Document development devices and processes according to aspects of the invention allow the automated recording, monitoring, and/or governing of document development. An example of a document development process performed by a document development in accordance with many embodiments of the invention are shown in FIG. 4B. The document development process 450 can include recording (460) document requirements. Document requirements can indicate specific inputs, outputs, algorithms, or other goals to be implemented in a document. Document requirements can be obtained (410) as described with respect to FIG. 4A. Branch creations can be recorded (462). Branch creations can include a name of the branch, a creation date, a developer and/or document development device requesting the branch creation, and/or any other data. The branch creations can be created (412) as described with respect to FIG. 4A. Test results can be recorded (464). The test results can include a pass/fail status for one or more unit tests and/or output data from the unit tests. The test results can be obtained from making (430) tests pass as described with respect to FIG. 4A. Code creation patterns can be recorded (466). The code creation patterns can include the creation of documents, running of unit tests, saving of documents, time and/or of number of refactors performed on documents, debugging documents, and/or any other activities performed during the development of a document. Linter results can be recorded (468). Linter results can include a set of coding errors made in a document. The linter results can be obtained from fixing (432) linter errors as described with respect to FIG. 4A. VCS commits can be recorded (470). VCS commits can include a name of the branch, a commit date, a developer and/or document development device requesting the commit, and/or any other data. The VCS commits can be obtained when document changes are committed (422) as described with respect to FIG. 4A. Gates/checks can be enforced (472). The gates/checks can include a variety of development practices, requirements, test coverage, and/or any other processes that are to be followed during the document development process. The gates/checks can be enforced (472) when changes are committed (422) and/or pushed (424) as described with respect to FIG. 4A. Push details can be recorded. Push details can include a name of the branch, a push date, a developer and/or document development device requesting the push, and/or any other data. The push details can be created when a push change is requested (424) as described with respect to FIG. 4A. Review results can be recorded (476). The review results can include any data and can be created when reviews are performed (426) as described with respect to FIG. 4A. A coding behavior model can be created (478). The coding behavior model can describe any features of the developer developing a document as described herein. Data can be transmitted (480) to a server system, such as a central processing server system. Any of the data recorded and/or generated during the document development process 450 can be stored using a database on a document developer machine, in a database on a central processing server system, and/or a combination thereof. In several embodiments, the data can be stored using a document developer machine and uploaded in bulk to a central processing server system during periods of inactivity on the document developer machine and/or on a schedule.

In a variety of embodiments, a central processing server system obtains data from a number of document development devices, generates performance data, and/or provides a variety of machine classifiers that automatically govern document quality as well as aid developer training. The automated enforcement of document development practices, such as test driven development, ensuring unit test coverage exceeding a threshold value, successful builds, and the like, can be performed prior to documents validation before allowing the documents to be checked in to a common database. For example, the development and/or check in of unit tests can be forced to be performed prior to the development of code to cause the unit tests to pass. Document review can be mandated and automatically enforced. Per-developer profiles can be automatically generated to identify unique issues for each developer and document reviewers can be informed of errors commonly made by a particular developer. User interfaces can be provided to allow for developers and managers to view the developer profiles and/or identify patterns regarding adherence to particular practices.

Machine classifiers can be used to identify trends and improve document development. The machine classifiers can be trained on a dataset of common errors, positive developer attributes, curated example documents, etc. The machine classifiers can also be paired with a developer during the creation of a document to (1) automatically identify issues and/or unit test coverage, (2) ensure document development processes, standards, and/or patterns are being followed, and/or (3) correct errors during document development. The machine classifier can identify issues and provide real-time feedback to the developer to identify and correct issues.

These and various other arrangements will be described more fully herein. As will be appreciated by one of skill in the art upon reading the following disclosure, various aspects described herein can be embodied as a method, a computer system, or a computer program product. Accordingly, those aspects can take the form of an entirely hardware embodiment, an entirely software embodiment, or an embodiment combining software and hardware aspects. Furthermore, such aspects can take the form of a computer program product stored by one or more computer-readable storage media having computer-readable program code, or instructions, embodied in or on the storage media. Any suitable computer-readable storage media can be utilized, including hard disks, CD-ROMs, optical storage devices, magnetic storage devices, and/or any combination thereof. In addition, various signals representing data or events as described herein can be transferred between a source and a destination in the form of electromagnetic waves traveling through signal-conducting media such as metal wires, optical fibers, and/or wireless transmission media (e.g., air and/or space).

Document Development Systems and Computing Devices

FIG. 1 illustrates a document development system 100 in accordance with an embodiment of the invention. The document development system 100 includes at least one document development device 110, at least one document storage system 120, and/or at least one central processing server system 130 in communication via a network 140. Any of the devices and systems described herein can be implemented, in whole or in part, using one or more computing systems described with respect to FIG. 2.

Document development devices 110 can allow users to create a variety of documents and provide feedback regarding the developed documents as described herein. Document storage systems 120 can provide a common database for storing documents. Common databases can include, but are not limited to, relational databases, distributed databases, any version control systems such as CVS, Subversion, GIT, ClearCase, Team Foundation Server, Visual SourceSafe, GNU arch, and/or a combination thereof. Central processing server systems 130 can obtain data captured via the document development devices and process the data to generate developer ratings, identify common issues, and/or provide targeted feedback. Additionally, central processing server systems 130 can train and/or provide machine classifiers to perform any of the processes described herein. The network 140 can include a local area network (LAN), a wide area network (WAN), a wireless telecommunications network, and/or any other communication network or combination thereof.

As discussed herein, the data transferred to and from various devices in a document development system 100 can include secure and sensitive data, such as confidential documents, developer profiles, and/or procedures for developing documents. Therefore, it can be desirable to protect transmissions of such data using secure network protocols and encryption, and/or to protect the integrity of the data when stored on the various computing devices within the document development system. For example, a file-based integration scheme or a service-based integration scheme can be utilized for transmitting data between the various computing devices. Data can be transmitted using various network communication protocols. Secure data transmission protocols and/or encryption can be used in file transfers to protect the integrity of the data, for example, File Transfer Protocol (FTP), Secure File Transfer Protocol (SFTP), and/or Pretty Good Privacy (PGP) encryption. In many embodiments, one or more web services can be implemented within the various computing devices. Web services can be accessed by authorized external devices and users to support input, extraction, and manipulation of data between the various computing devices in the document development system 100. Web services built to support a personalized display system can be cross-domain and/or cross-platform, and can be built for enterprise use. Such web services can be developed in accordance with various web service standards, such as the Web Service Interoperability (WS-I) guidelines. Data can be transmitted using the Secure Sockets Layer (SSL) or Transport Layer Security (TLS) protocol to provide secure connections between the computing devices. Web services can be implemented using the WS-Security standard, which provides for secure SOAP messages using XML encryption. Specialized hardware can be used to provide secure web services. For example, secure network appliances can include built-in features such as hardware-accelerated SSL and HTTPS, WS-Security, and/or firewalls. Such specialized hardware can be installed and configured in the document development system 100 in front of one or more computing devices such that any external devices can communicate directly with the specialized hardware.

It will be appreciated that the network connections shown are illustrative and other means of establishing a communications link between the computers can be used. The existence of any of various network protocols such as TCP/IP, Ethernet, FTP, HTTP and the like, and of various wireless communication technologies such as GSM, CDMA, WiFi, and WiMAX, is presumed, and the various computing devices described herein can be configured to communicate using any of these network protocols or technologies.

Figure 2:
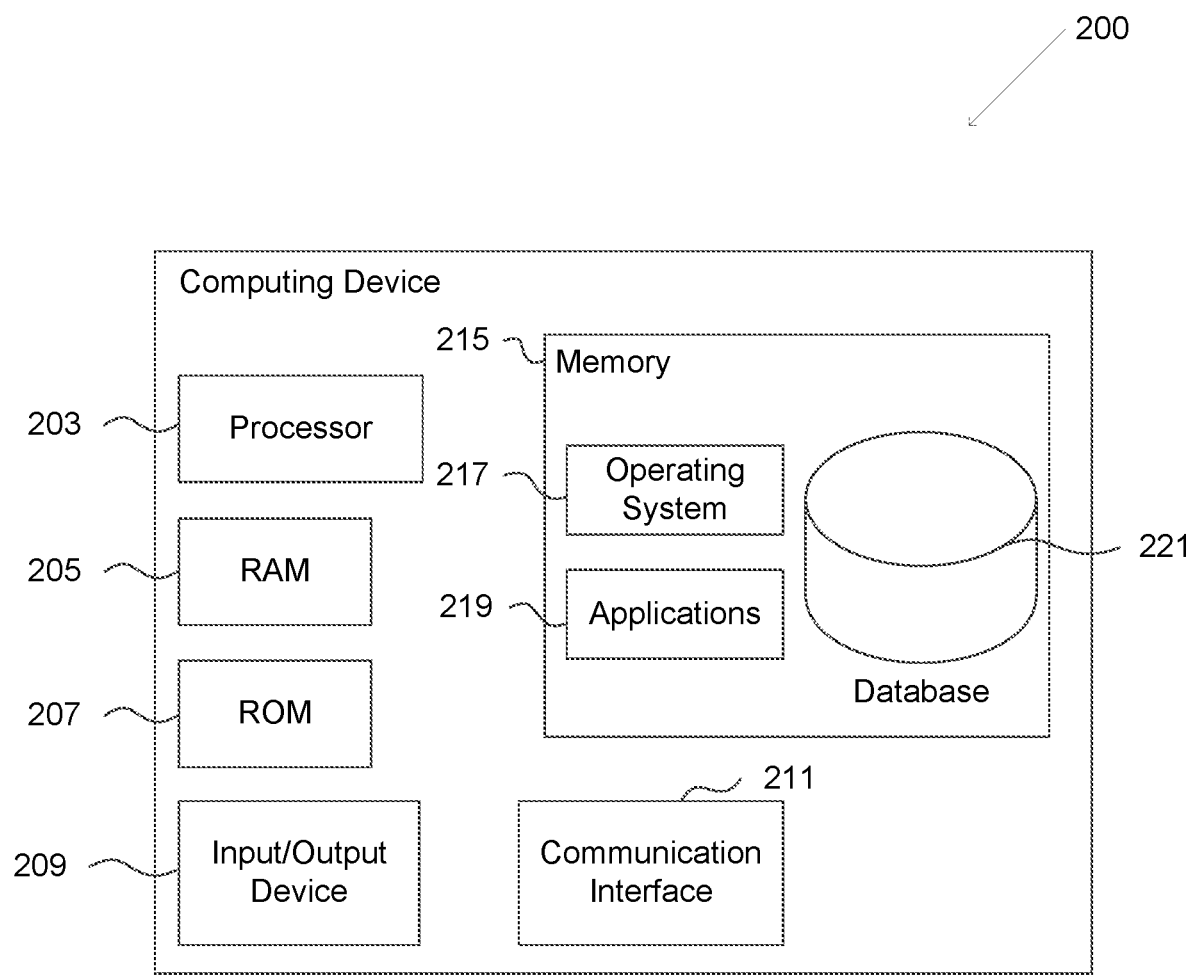
FIG. 2 illustrates an example computing device in accordance with one or more aspects described herein.

Turning now to FIG. 2, a computing device 200 in accordance with an embodiment of the invention is shown. The computing device 200 can include a processor 203 for controlling overall operation of the computing device 200 and its associated components, including RAM 205, ROM 207, input/output device 209, communication interface 211, and/or memory 215. A data bus can interconnect processor(s) 203, RAM 205, ROM 207, memory 215, I/O device 209, and/or communication interface 211.

Input/output (I/O) device 209 can include a microphone, keypad, touch screen, and/or stylus through which a user of the computing device 200 can provide input, and can also include one or more of a speaker for providing audio output and a video display device for providing textual, audiovisual, and/or graphical output. Software can be stored within memory 215 to provide instructions to processor 203 allowing computing device 200 to perform various actions. For example, memory 215 can store software used by the computing device 200, such as an operating system 217, application programs 219, and/or an associated internal database 221. The various hardware memory units in memory 215 can include volatile and nonvolatile, removable and non-removable media implemented in any method or technology for storage of information such as computer-readable instructions, data structures, program modules, or other data. Memory 215 can include one or more physical persistent memory devices and/or one or more non-persistent memory devices. Memory 215 can include, but is not limited to, random access memory (RAM) 205, read only memory (ROM) 207, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 203.

Communication interface 211 can include one or more transceivers, digital signal processors, and/or additional circuitry and software for communicating via any network, wired or wireless, using any protocol as described herein.

Processor 203 can include a single central processing unit (CPU), which can be a single-core or multi-core processor (e.g., dual-core, quad-core, etc.), or can include multiple CPUs. Processor(s) 203 and associated components can allow the computing device 200 to execute a series of computer-readable instructions to perform some or all of the processes described herein. Although not shown in FIG. 2, various elements within memory 215 or other components in computing device 200, can include one or more caches, for example, CPU caches used by the processor 203, page caches used by the operating system 217, disk caches of a hard drive, and/or database caches used to cache content from database 221. For embodiments including a CPU cache, the CPU cache can be used by one or more processors 203 to reduce memory latency and access time. A processor 203 can retrieve data from or write data to the CPU cache rather than reading/writing to memory 215, which can improve the speed of these operations. In some examples, a database cache can be created in which certain data from a database 221 is cached in a separate smaller database in a memory separate from the database, such as in RAM 205 or on a separate computing device. For instance, in a multi-tiered application, a database cache on an application server can reduce data retrieval and data manipulation time by not needing to communicate over a network with a back-end database server. These types of caches and others can be included in various embodiments, and can provide potential advantages in certain implementations of document development systems, such as faster response times and less dependence on network conditions when transmitting and receiving data.

Although various components of computing device 200 are described separately, functionality of the various components can be combined and/or performed by a single component and/or multiple computing devices in communication without departing from the invention.

Automated Document Validation and Developer Assistance

Document development systems allow for the automatic validation of documents and automatic generation of performance data to improve the document creation process. Document development devices typically provide an integrated development environment (IDE) that allows a developer to draft documents, compile those documents, and check the documents into a common database. In a variety of embodiments, a plugin or other application can be installed on a document development device to provide a variety of document development processes described herein using an IDE. Any of the document development processes can be performed when the resource utilization (e.g. processor utilization, memory utilization, etc.) of a computing device, such as a document development device, is below a threshold value. For example, the break and/or lunch times of a user of a document development device can be determined and the downtime of the document development device can be utilized to perform document development processes without affecting the user experience.

Figure 3:
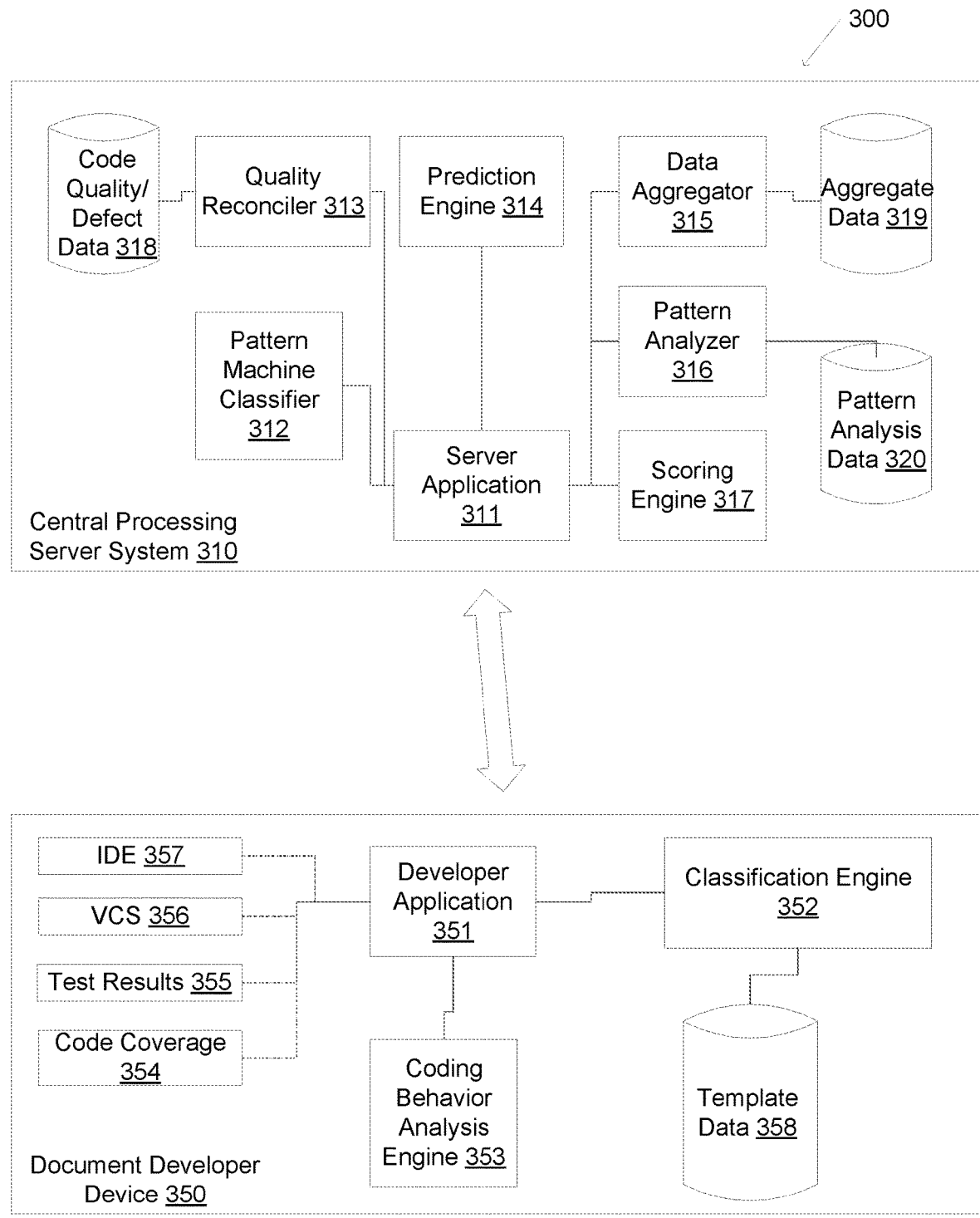
FIG. 3 illustrates an example of a document development device and a central processing server system.

A conceptual illustration 300 of a document development device 350 in communication with a central processing server system 310 is shown in FIG. 3. The central processing server system 310 can include a server application 311 having components pattern machine classifier 312, quality reconciler 313, prediction engine 314, data aggregator 315, pattern analyzer 316, and/or scoring engine 317. The pattern machine classifier 312 can identify common document patterns, such as common errors in document creation and/or coding errors, using any of a variety of machine classifiers. Quality reconciler 313 can determine code quality issues and other code defects, which can be stored in code quality/defect database 318. Prediction engine 314 can predict and/or recommend common corrections and/or particular coding practices. These predictions can be made based on a developer profile. For example, the prediction engine can be utilized to provide recommendations to a developer by being the second member of a pair programming team. Data aggregator 315 can obtain performance data from a variety of document development devices. The obtained data can be aggregated and/or anonymized to identify trends in the data. The data can be stored in an aggregate database 319. Pattern analyzer 316 can process, such as by using one or more machine classifiers, any of the data and/or pattern analysis data to identify trends in the data. The analyzed patterns can be stored using pattern analysis database 320. Scoring engine 317 can be used to generate a variety of developer scores and/or models as described herein. A variety of user interfaces can be used to view and/or interact with the scores and/or models.

Document development device 350 can include a developer application 351 having a classification engine 352 and/or coding behavior analysis engine 353. The developer application 351 can also interact with and/or control a code coverage application 354, test results 355, a version control system interface 356, and/or an IDE 357. The classification engine 352 can process input data received from an I/O device and determine one or more actions, such as code development, unit test development, refactoring, and the like, corresponding to the input data. The classification engine 352 can use a variety of rules, gates, and/or templates stored using template data 358. Coding behavior analysis engine 353 can dynamically determine one or more behaviors, such as determining if best practices are being followed, during a variety of document development processes. Developer application 351 can also interact with a variety of external tools, such as a code coverage tool 354, a test result tool 355, a VCS interaction tool 356, and/or an IDE 357. These interactions can be performed using a variety of application programming interfaces. Code coverage tool 354 can determine the coverage of a set of unit tests for a particular document. Test results 355 can include the results from a set of unit tests performed on one or more documents. VCS 356 can allow for the check-in and/or check-out of documents. IDE 357 can provide a variety of tools, such as a document editor, to facilitate the creation and/or editing of documents.

The document development processes can include determining when documents are created, the type of documents (e.g. unit test or code files) created, the amount of time writing the documents, how many times the documents were modified after the initial creation, and/or calculating document complexity. Document development processes can include automatically running unit tests and/or analyzing unit test results to check for document completion, test coverage, and/or inefficient unit testing. For example, a suite of unit tests may only cover 75% of a document, while the corresponding coverage standard may be 95%. Document development processes can also include determining code changes, such as correction of improper document creation techniques (e.g. linting), and tracking the quantity and/or frequency of those changes. Code quality metrics can be determined based on these code changes. The coding quality metrics can include, but are not limited to, commits (e.g. check-in of documents to a common database), trend reports, and/or evolutionary information for the code. This information can be stored using any of the computing devices and can be utilized to determine overall trends and/or per-developer trends as described herein.

Figure 4A:
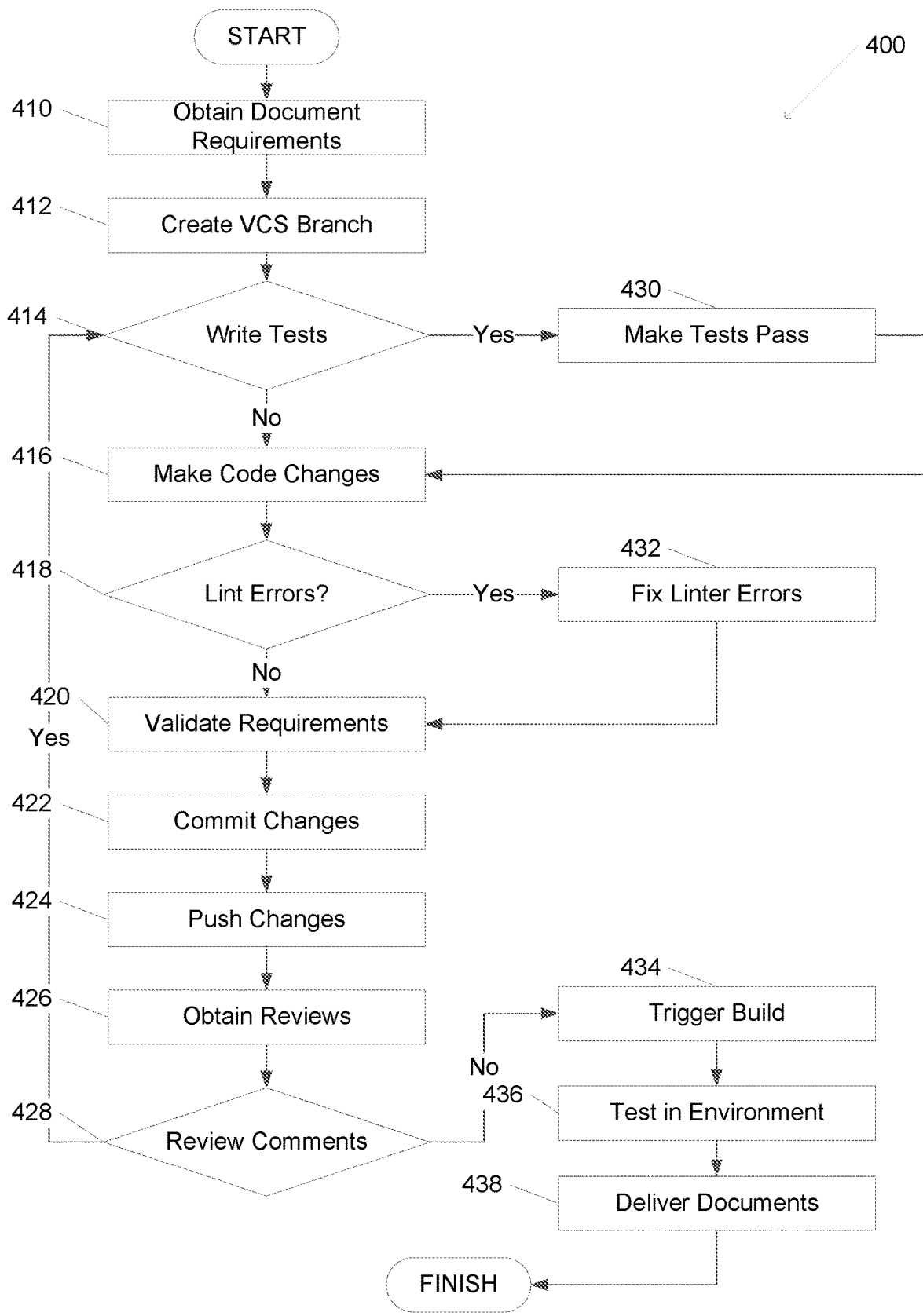
FIG. 4A is a flow chart illustrating a document creation lifecycle in accordance with an embodiment of the invention.
Figure 4B:
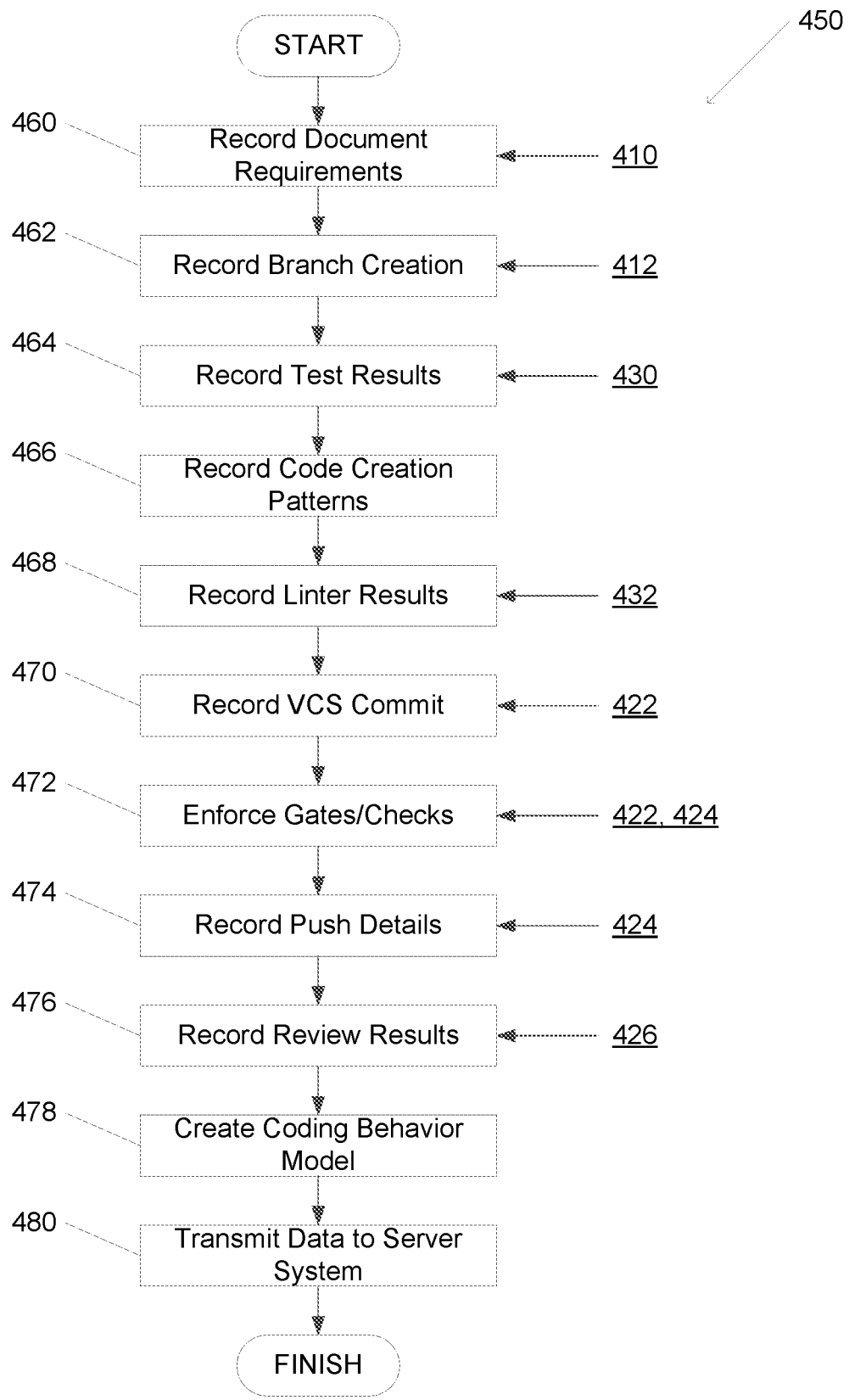
FIG. 4B is a flow chart illustrating aspects of document creation processes in a document creation lifecycle in accordance with an embodiment of the invention.

An example of a typical process for developing documents is shown in FIG. 4A. The document creation lifecycle 400 can include obtaining (410) document requirements. The document requirements can define particular features and/or content that a document needs to provide. A version control system (VCS) branch can be created (412). A VCS branch can include a private version, forked from a parent branch, of a codebase in a common database so that changes can be made to one or more documents without propagating those changes to everyone pulling files from a parent branch. Tests, such as unit tests, can be written (414). When tests are written (414), code changes can be made (416) to make the tests pass (430). When tests do not need to be written (414), code changes can be made (416). The documents can be linted (418). Lint, linting, and linter are terms of art and as used herein will be readily understood by those having ordinary skill in the art. When linter errors occur (418), those errors can be fixed (432). When there are no linter errors (418), the document requirements can be validated (420) and the changes can be committed (422) to the common database. The VCS branch can be pushed (424) to its parent branch. Reviews can be obtained (426) for the documents. The reviews can indicate adherence to procedures, fulfillment (or lack thereof) of the document requirements, code quality feedback, and the like. If the review comments require correction (428), the document development process can return to writing (414) additional tests. When no comments require correction (428), a build can be triggered (434). A build process can convert one or more documents, such as the documents associated with a branch in a common database, into an executable program. The results of the build process can be tested (436) in a test environment. For example, the results can be tested to ensure that the requirements defined in the document requirements have been implemented and/or no other bugs or errors have been introduced in the development of the documents. The documents can be delivered (438). Delivering documents can include pushing an updated version of a software application to a live system, thereby providing an updated software platform usable by end users.

Figure 5:
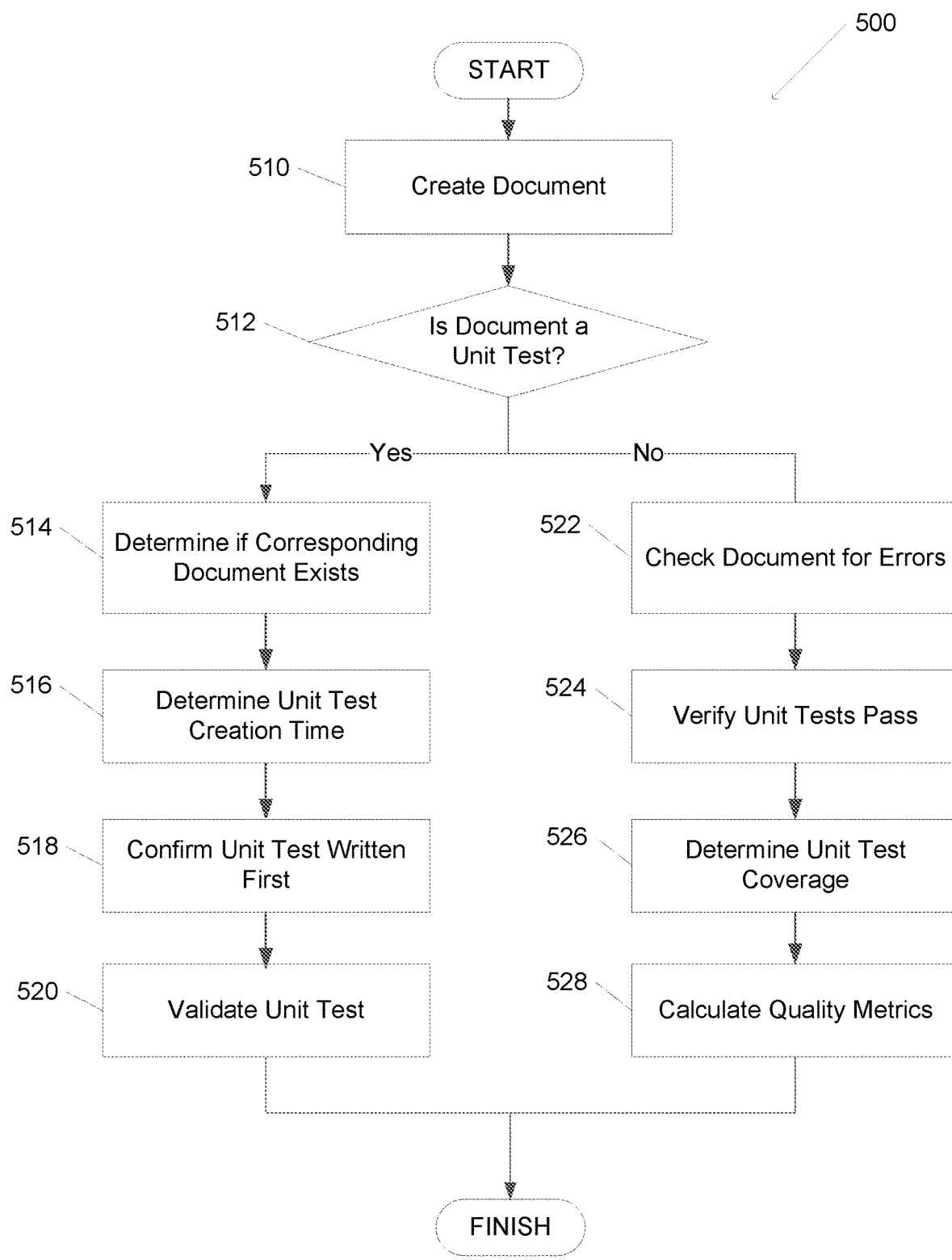
FIG. 5 is a flow chart illustrating a process for developing a document in accordance with an embodiment of the invention.

A flow chart illustrating a process for developing a document in accordance with an embodiment of the invention is shown in FIG. 5. The process 500 includes creating (510) a document. In several embodiments, documents are typically either code files or unit tests. Code files include a variety of functions that can perform one or more actions, while unit tests include a variety of tests for testing the functions provided by the code files. When the document is (512) a unit test, a corresponding document can be determined (514). A unit test can be created before a document is created (e.g. for test-driven development) and/or created after a document is created (e.g. to ensure sufficient code coverage and/or to add tests for newly added features). A unit test creation time can be determined (516). A confirmation (518) can be determined to ensure a unit test was created before the corresponding document. The determination can be made based on the creation and/or edit time of the unit test and the creation and/or edit date of a document. In this way, the creation of tests prior to the corresponding code can be identified and/or enforced. The unit tests can be validated (520). Validating a unit test can include determining that the unit test properly tests for one or more requirements for a document.

When the document is not (512) a unit test, a document can be checked (522) for errors. An error in a document can include one or more aspects of the document that cause a corresponding unit test to fail. The passing of unit tests can be verified (524) and unit test coverage can be determined (526). Unit tests are designed to cause one or more aspects of a document (such as, but not limited to, functions defined in a code file) to be performed. Unit test coverage can be expressed as a percentage of aspects of a document, relative to all aspects of the document, which are performed by one or more unit tests. Quality metrics can be calculated (528). The quality metrics can describe the quality of one or more aspects of the code, total development time, linter errors, adherence to procedures, and the like.

A document development device can perform a variety of document development processes to add documents to, and check out documents from, a common database. In several embodiments, an IDE facilitates the check-in and check-out process. Document development processes can include determining time stamps for when documents are created, added to a common database, and/or checked out from a common database along with an indication of what was modified in the document. This data can be provided to a central processing server system for further processing and analysis as described herein.

Figure 6:
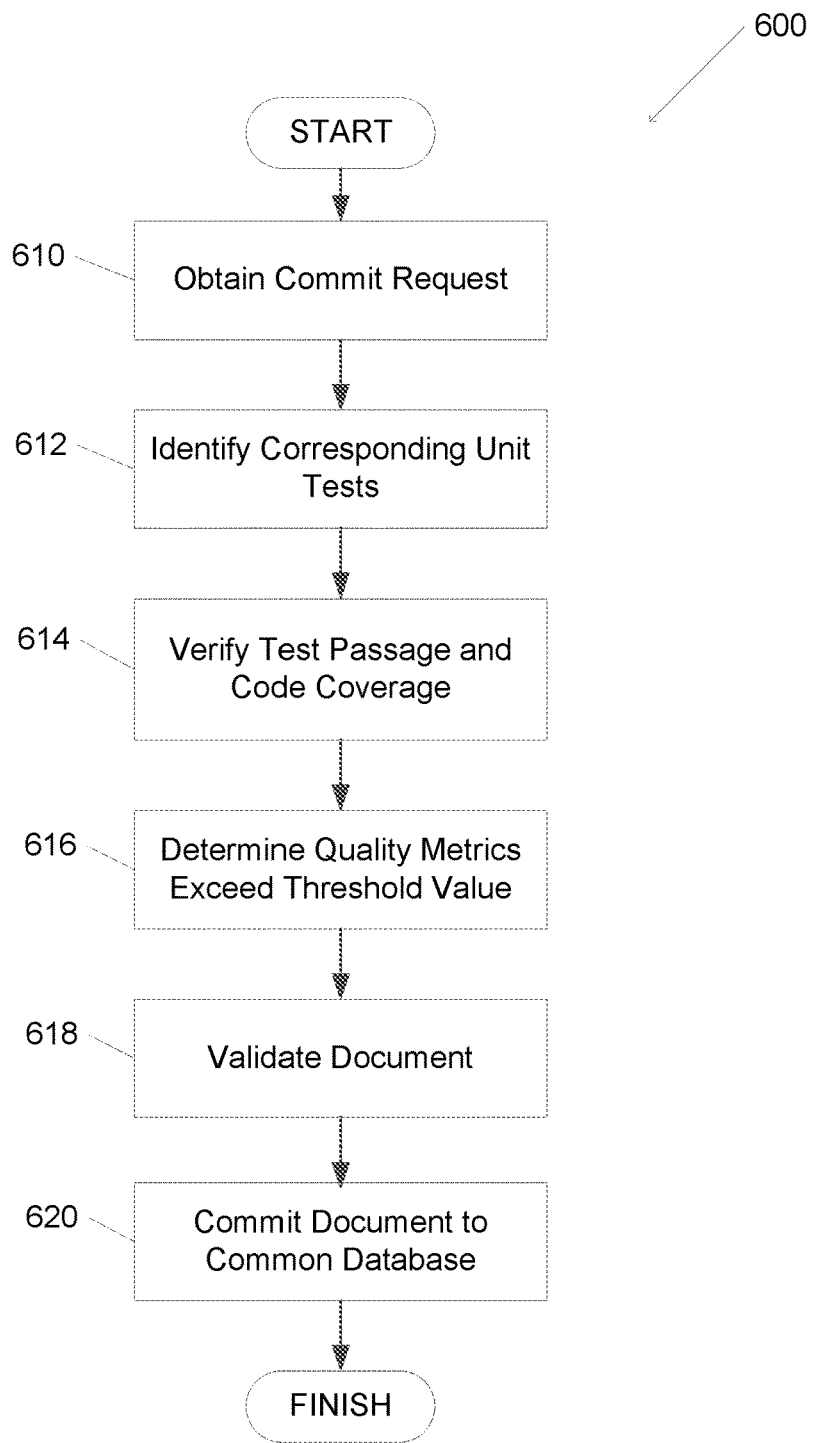
FIG. 6 is a flow chart illustrating a process for managing a document in a common database in accordance with an embodiment of the invention.

A flow chart illustrating a process for managing a document in a common database in accordance with an embodiment of the invention is shown in FIG. 6. The process 600 includes obtaining (610) a commit request. The commit request can include a commit to a branch and/or a request to merge a branch and identify one or more documents. Corresponding unit tests can be identified (612). The unit tests can correspond to the documents associated with the commit request. Test passage and coverage can be verified (614). Quality metrics can be determined (616) to exceed a threshold value. The determination of quality metrics can ensure that the document(s) being committed have been developed according to the defined practices, have sufficient test coverage, and aspects of the code meet or exceed an expected code quality. The document(s) can be validated (618) as described herein. The documents can be committed (620) to a common database. Committing a document can include updating one or more documents stored in a common database, generating a change document that can be applied to a document in the common database, merging a branch into its parent, and/or the like.

In many embodiments, documents may not be checked in to a common database without being validated. Document development processes can also include automatically analyzing the documents to ensure that particular standards, such as variable hardcoding, class names, rules, templates, design requirements, etc., are properly implemented. Pull (e.g. check-out) requests from a common database can be verified to ensure that a reviewer actually obtains a copy of a document and views the document for a sufficient time to perform a review of the document. In a variety of embodiments, the time can be determined by calculating a period defined by the check-out and check-in of the document. The review time can be pre-determined and/or determined dynamically based on the length of the document and/or a previous automated review.

Figure 7:
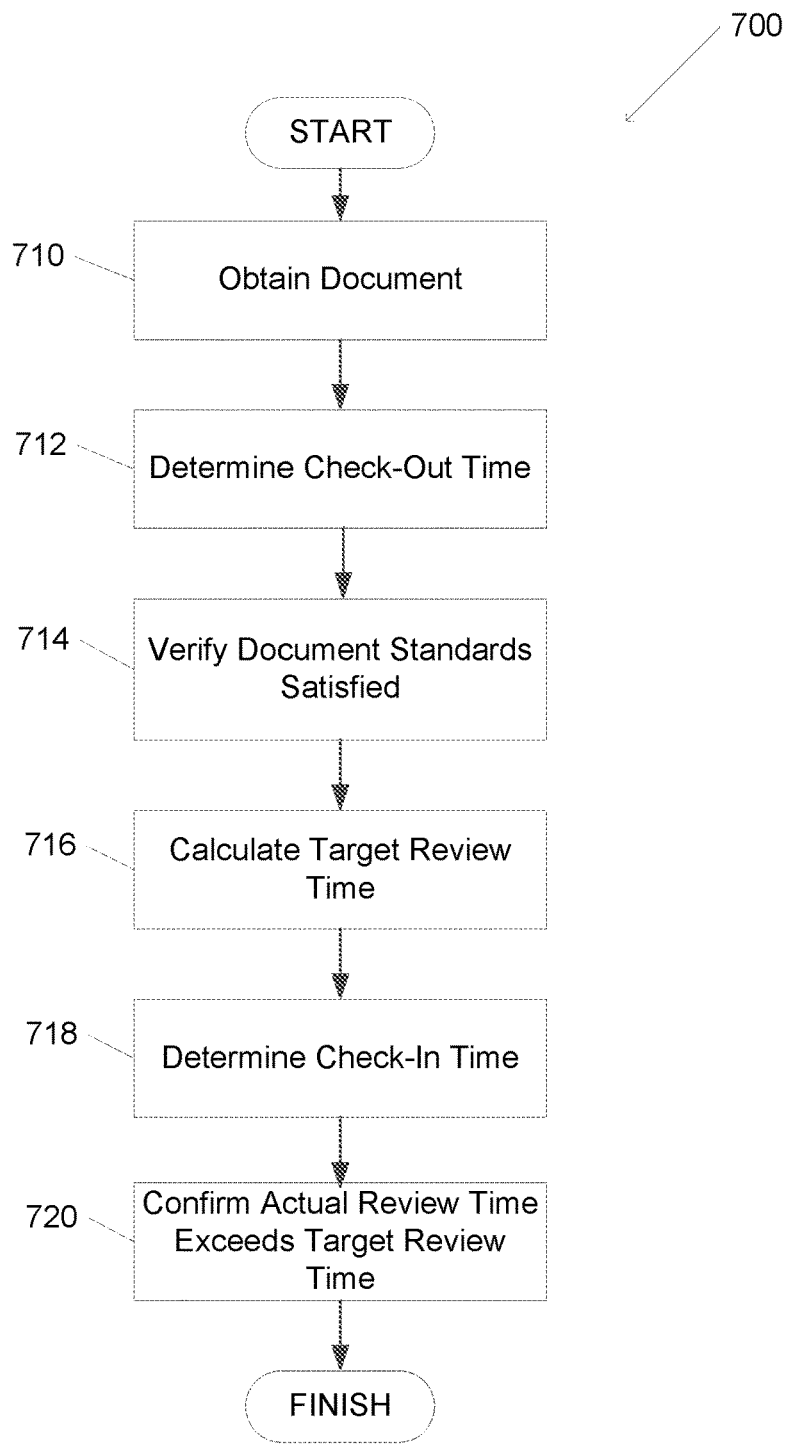
FIG. 7 is a flow chart illustrating a process for reviewing a document in accordance with an embodiment of the invention.

A flow chart illustrating a process for reviewing a document in accordance with an embodiment of the invention is shown in FIG. 7. The process 700 includes obtaining a document. The check-out time of the document can be determined (712). The check-out time of a document can be determined when a reviewer initiates a pull request for the document. Document standards can be verified (714). In many embodiments, one or more machine classifiers can be used to determine that one or more aspects of the document satisfy one or more document standards as described herein. A target review time can be calculated (716). The target review time can be pre-determined and/or determined dynamically based on a variety of factors, such as the author of the document, the length of the document, the complexity of the document, and the like. A check-in time can be determined (718). The check-in time can be determined when a reviewer initiates a commit request for the document. An actual review time can be calculated and it can be confirmed (720) that the actual review time exceeds a target review time. The actual review time can be based on the check-out time, the check-in time, the amount of time the document was open, the amount of time that the reviewer edited and/or provided comments on the document, and the like.

A number of document development processes can include determining performance metrics for document developers and/or identifying common errors using a variety of machine learning techniques. In this way, the document development processes performed across a number of document development devices can be processed to identify trends and corrective suggestions which can then be utilized by a variety of developers. The machine classifiers can utilize a variety of rules and/or patterns to determine appropriate quality checks and identify potentially troublesome (or beneficial) trends in the development process. These can be aggregated and/or performed on a per-developer basis. A code quality defect data store can store incident data and/or commit data that can be collated and used to analyze developer efficiency and provide the information back to the document development devices to improve quality. Code quality defect data can be analyzed to generate patterns and analysis. The code quality defect data can be correlated with commit information to identify when (and/or by whom) defects were introduced. Document models including a variety of coding patterns can be identified for curation and stereotyping code patterns for application reviews and published to document developer devices. Predictive data can be generated which can be used to predict actions and/or generate recommendations by data mining and machine classification of the documents and associated data. This can be used to predict a likelihood of modifications to a document breaking a build process and/or calculate a risk associated with a particular document commit. For example, a modification to a document can break a build process by causing one or more documents stored in a version control system to fail to compile once the modified document is committed to the version control system. This predictive data can also be utilized by document development devices to provide live feedback to developers to improve document development and/or identify potential bugs or other issues in the document without needing to compile and/or test the document.

Figure 8:
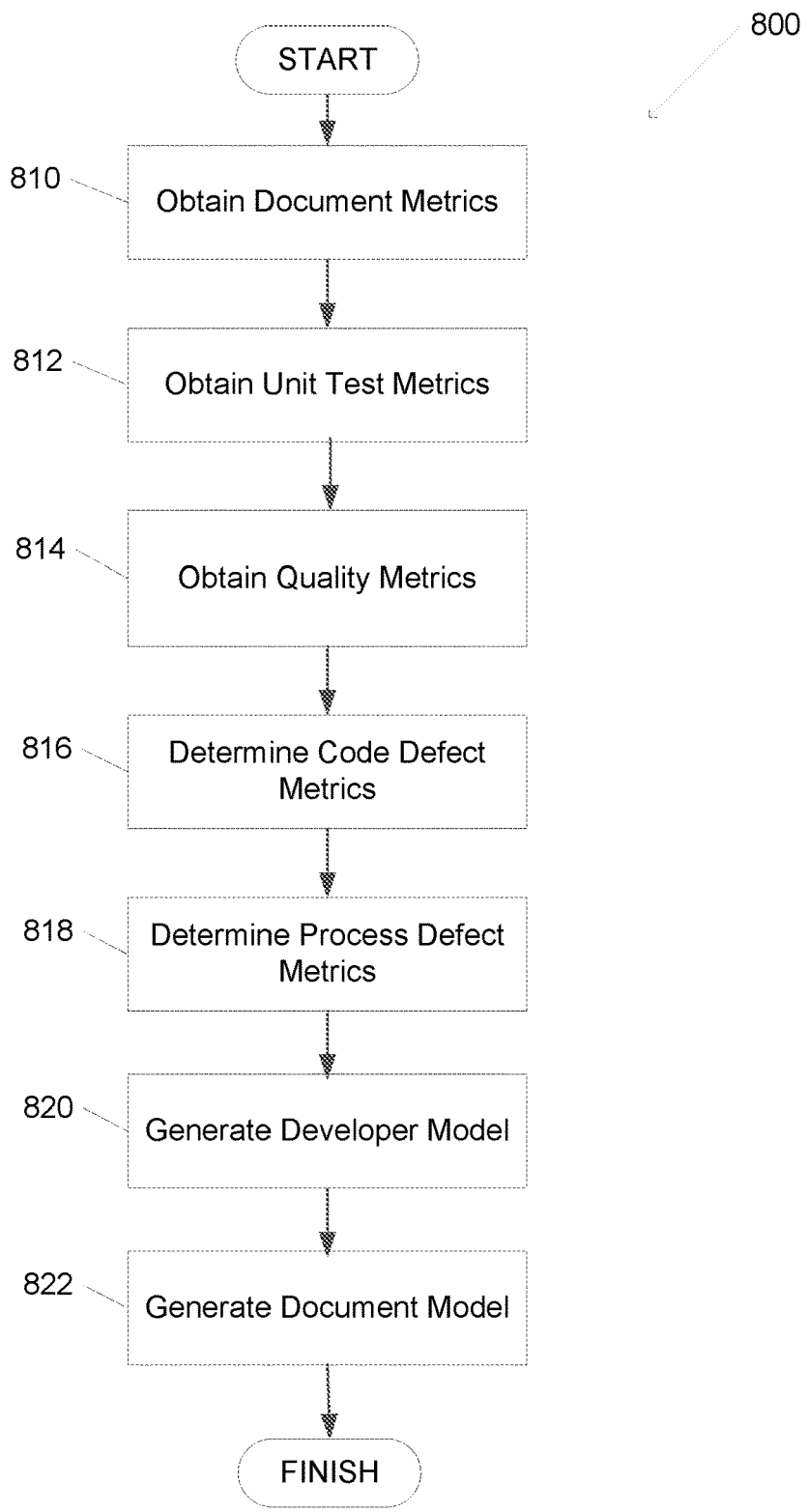
FIG. 8 is a flow chart illustrating a process for generating metrics in accordance with an embodiment of the invention.

A flow chart illustrating a process for generating metrics in accordance with an embodiment of the invention is shown in FIG. 8. The process 800 included obtaining (810) document metrics, obtaining (812) unit test metrics, and/or obtaining (814) quality metrics as described herein. Code defect metrics can be determined (816). The code defect metrics can describe a variety of errors or other defects in the document, such as linter errors and the like. Process defect metrics can be determined (818). The process defect metrics can describe breakdowns in the development process, such as a failure to develop unit tests before documents, unit test coverage deficiencies, failure to adhere to document development standards, and the like. A developer model can be generated (820). The developer model can describe how a developer develops unit tests and documents, errors likely to be made by the developer, and the like. The developer model may describe the developer with respect to an average model developer. The developer model can be generated using any of a variety of machine learning techniques. A document model can be generated (822). The document model can describe errors in the document, aspects of the document likely to need refactoring, a likelihood that the document will cause build errors, and the like. The document model can be generated using a variety of machine learning techniques.

Document commits can be scored based on governance targets and/or goals. These scores can be used to educate developers as well as track developer growth and progress over time. A variety of user interfaces can be utilized to view and/or interact with the scores, such as a social leaderboard providing inputs for developer growth and identifying high-performing developers and/or reviewers.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures can be performed in other than the recited order, and that one or more steps illustrated can be optional in accordance with aspects of the disclosure. Further, one or more aspects described with respect to one figure or arrangement can be used in conjunction with other aspects associated with another figure or portion of the description.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method, comprising:
   generating, by a computing device, a document based on document requirement data;
   identifying, by the computing device, a set of unit tests based on the document requirement data and corresponding to the document;
   predicting, via a machine learning model and based on a machine learning classifier trained on at least a dataset of common errors, in real-time an error within the document without compiling the document;
   generating, via the machine learning model, a correction recommendation to correct the error;
   predicting, without compiling or testing the document, a break build likelihood indicative that the correction recommendation to the document would break a build process by causing a stored associated document in version control to fail to compile post commit;
   receiving a revision of the document based on the correction recommendation and the break build likelihood of the correction recommendation;
   calculating, by the computing device, a code coverage metric based on the set of unit tests based on the document requirement data performed on the document and passed;
   calculating, by the computing device, one or more quality metrics based on zero or more linter errors in the document; and when the code coverage metric exceeds a coverage threshold value and the one or more quality metrics exceeds a quality threshold value, transmitting, by the computing device and to a version control system, a check-in request comprising the document and the set of unit tests.

2. The method of claim 1, wherein:
the document requirement data comprises an indication of a first creation date of the document and an indication of a second creation date of the set of unit tests; and
validating the document further comprises determining that the second creation date is prior to the first creation date.

3. The method of claim 1, wherein the method further comprises determining an amount of time spent refactoring the document.

4. The method of claim 1, wherein the method further comprises determining a number of refactors of the document.

5. The method of claim 1, further comprising:
determining, by the computing device, a set of coding errors as the zero or more linter errors in the document by linting the document; and
validating the document based on the set of coding errors.

6. The method of claim 1, further comprising:
transmitting, by the computing device, validation results for the document;
obtaining, by the computing device, feedback determined based on the validation results; and
providing, by the computing device, the feedback.

7. The method of claim 6, wherein the feedback is provided in real-time.

8. A computing device, comprising:
a processor; and
a memory in communication with the processor and storing instructions that, when executed by the processor, cause the computing device to:
generate a document based on document requirement data;
identify a set of unit tests based on the document requirement data and corresponding to the document;
predict, via a machine learning model and based on a machine learning classifier trained on at least a dataset of common errors, in real-time an error within the document without compiling the document;
generate, via the machine learning model, a correction recommendation to correct the error;
predict, without compiling or testing the document, a break build likelihood indicative that the correction recommendation to the document would break a build process by causing a stored associated document in version control to fail to compile post commit;
receive a revision of the document based on the correction recommendation and the break build likelihood of the correction recommendation;
calculate a code coverage metric based on the set of unit tests based on the document requirement data performed on the document and passed;
calculate one or more quality metrics based on zero or more linter errors in the document; and
when the code coverage metric exceeds a coverage threshold value and the one or more quality metrics exceeds a quality threshold value, transmit, to a version control system, a check-in request comprising the document and the set of unit tests.

9. The computing device of claim 8, wherein:
the document requirement data comprises an indication of a first creation date of the document and an indication of a second creation date of the set of unit tests; and
the instructions, when executed by the processor, further cause the computing device to validate the document by determining that the second creation date is prior to the first creation date.

10. The computing device of claim 8, wherein the instructions, when executed by the processor, further cause the computing device to validate the document by determining an amount of time spent refactoring the document.

11. The computing device of claim 8, wherein the instructions, when executed by the processor, further cause the computing device to validate the document by determining a number of refactors of the document.

12. The computing device of claim 8, wherein the instructions, when executed by the processor, further cause the computing device to:
determine, by the computing device, a set of coding errors as the zero or more linter errors in the document by linting the document; and
validate the document based on the set of coding errors.

13. The computing device of claim 8, wherein the instructions, when executed by the processor, further cause the computing device to:
transmit validation results for the document;
obtain feedback determined based on the validation results; and
provide the feedback.

14. The computing device of claim 13, wherein the feedback is provided in real-time.

15. A non-transitory machine-readable medium storing instructions that, when executed by one or more processors, cause the one or more processors to perform steps comprising:
generating a document based on document requirement data;
identifying a set of unit tests based on the document requirement data and corresponding to the document;
predicting, via a machine learning model and based on a machine learning classifier trained on at least a dataset of common errors, in real-time an error within the document without compiling the document;
generating, via the machine learning model, a correction recommendation to correct the error;
predicting, without compiling or testing the document, a break build likelihood indicative that the correction recommendation to the document would break a build process by causing a stored associated document in version control to fail to compile post commit;
receiving a revision of the document based on the correction recommendation and the break build likelihood of the correction recommendation;
calculating a code coverage metric based on the set of unit tests based on the document requirement data performed on the document and passed;
calculating one or more quality metrics based on zero or more linter errors in the document; and
when the code coverage metric exceeds a coverage threshold value and the one or more quality metrics exceeds a quality threshold value, transmitting, to a version control system, a check-in request comprising the document and the set of unit tests.

16. The non-transitory machine-readable medium of claim 15, wherein:
the document requirement data comprises an indication of a first creation date of the document and an indication of a second creation date of the set of unit tests; and
validating the document further comprises determining that the second creation date is prior to the first creation date.

17. The non-transitory machine-readable medium of claim 15, wherein the steps further comprises determining an amount of time spent refactoring the document.

18. The non-transitory machine-readable medium of claim 15, wherein the steps further comprises determining a number of refactors of the document.

19. The non-transitory machine-readable medium of claim 15, wherein the instructions, when executed by one or more processors, further cause the one or more processors to perform steps comprising:
determining a set of coding errors as the zero or more linter errors in the document by linting the document; and
validating the document based on the set of coding errors.

20. The non-transitory machine-readable medium of claim 15, wherein the instructions, when executed by one or more processors, further cause the one or more processors to perform steps comprising:
transmitting validation results for the document;
obtaining feedback determined based on the validation results; and
providing, in real-time, the feedback.

* * * * *